(12) United States Patent
Yabuuchi et al.

(10) Patent No.: US 12,374,156 B2
(45) Date of Patent: Jul. 29, 2025

(54) ACCESSIBILITY DETERMINATION DEVICE, ACCESSIBILITY DETERMINATION METHOD, AND PROGRAM

(71) Applicant: OMRON Corporation, Kyoto (JP)

(72) Inventors: Tomohiro Yabuuchi, Kyoto (JP); Kazuo Yamamoto, Kyoto (JP); Naoto Iwamoto, Kyoto (JP); Endri Rama, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 345 days.

(21) Appl. No.: 17/908,428

(22) PCT Filed: Feb. 10, 2021

(86) PCT No.: PCT/JP2021/004982
§ 371 (c)(1),
(2) Date: Aug. 31, 2022

(87) PCT Pub. No.: WO2021/181991
PCT Pub. Date: Sep. 16, 2021

(65) Prior Publication Data
US 2024/0029473 A1 Jan. 25, 2024

(30) Foreign Application Priority Data
Mar. 13, 2020 (JP) .................... 2020-043947

(51) Int. Cl.
*G06V 40/16* (2022.01)
*G06T 7/20* (2017.01)
*G06T 7/70* (2017.01)

(52) U.S. Cl.
CPC .............. *G06V 40/172* (2022.01); *G06T 7/20* (2013.01); *G06T 7/70* (2017.01); *G06V 40/161* (2022.01);
(Continued)

(58) Field of Classification Search
CPC .. G06V 40/172; G06V 40/161; G06V 40/174; G06V 40/165; G06T 7/20;
(Continued)

(56) References Cited

U.S. PATENT DOCUMENTS

| | | | |
|---|---|---|---|
| 9,720,259 B2 * | 8/2017 | Hart | A61B 5/163 |
| 11,681,496 B2 * | 6/2023 | Rama | G06V 40/20 |
| | | | 382/103 |

(Continued)

FOREIGN PATENT DOCUMENTS

| | | |
|---|---|---|
| JP | 2006115406 A | 4/2006 |
| JP | 2014174859 A1 | 9/2014 |

(Continued)

OTHER PUBLICATIONS

Panchanathan, et al, "Social Interaction Assistant: A Person-Centered Approach to Enrich Social Interactions for Individuals with visual Impairments"; IEEE Journal of Selected Topics in Signal Processing, vol. 10, No. 5, Aug. 2016; 10 pages. (Year: 2016).*

(Continued)

*Primary Examiner* — Wesley J Tucker
(74) *Attorney, Agent, or Firm* — CANTOR COLBURN LLP

(57) ABSTRACT

An accessibility determination device may include an imaging device that captures images of a surrounding environment of a user at time intervals to acquire a plurality of captured images; a facial organ detector that analyzes the captured images to detect a facial organ of a person that makes a notification to the user when the accessibility determined by processor satisfies a predetermined criterion and the target detector detects that the person is the predetermined target person. The processor may change the (Continued)

accessibility or the predetermined criterion depending on a distance between the imaging device and the person.

9 Claims, 6 Drawing Sheets

(52) U.S. Cl.
CPC .. *G06V 40/174* (2022.01); *G06T 2207/30201* (2013.01)

(58) Field of Classification Search
CPC ............ G06T 7/70; G06T 2207/30201; G06T 2207/20084; G06T 7/73
See application file for complete search history.

(56) References Cited

U.S. PATENT DOCUMENTS

| | | | |
|---|---|---|---|
| 11,954,908 B2* | 4/2024 | Rama | G08B 21/22 |
| 2006/0092292 A1 | 5/2006 | Matsuoka et al. | |
| 2014/0253701 A1* | 9/2014 | Wexler | G06F 1/163 |
| | | | 348/62 |
| 2018/0243157 A1* | 8/2018 | Takada | A61H 3/06 |
| 2020/0279279 A1* | 9/2020 | Chaudhuri | G06N 5/04 |
| 2021/0209362 A1* | 7/2021 | Wexler | G06V 40/20 |
| 2021/0279475 A1* | 9/2021 | Tusch | H04L 63/0861 |
| 2021/0304256 A1 | 9/2021 | Ishida et al. | |
| 2023/0236016 A1* | 7/2023 | Troncoso Aldas | G06F 1/1686 |
| | | | 701/433 |

FOREIGN PATENT DOCUMENTS

| | | |
|---|---|---|
| JP | 2017102846 A | 6/2017 |
| JP | 201855248 A | 4/2018 |
| JP | 2018124604 A | 8/2018 |

OTHER PUBLICATIONS

Panchanathan _ Social Interaction Assistant (Year: 2016).*
International Search Report for International Application No. PCT/JP2021/004982; Date of Mailing, May 11, 2021.
JPO PCT Written Opinion of the International Searching Authority for International Application No. PCT/JP2021/004982; Date of Mailing, May 11, 2021.
Mori et al., "The Digital Signage System Using Virtual Human for Getting Attention of Passersby", Information Processing Society of Japan; vol. 52, No. 4; pp. 1453-1464 (Apr. 2011).
Buimer, et al., "Conveying Facial expressions to blind and visually impaired persons through a wearable vibrotactile device"; PLOS One; vol. 13, No. 3, Mar. 27, 2018; 16 pages.
EPO Extended European Search Report for EP Application No. 21767611.3; Issued Jan. 8, 2024; 11 pages.
Faithi, et al., "Social Interactions: A First-Person Perspective"; 2012 IEEE Conference On, IEEE, Jun. 19, 2012, pp. 1226-1233, XP032232204.
McDaniel, et al., "Using Tactile Rhythm to Convey Interpersonal Distances to Individuals who are Blind"; World: Conference Proceedings and Extended Abstracts; the 27th Annual Chi Conference On Human Factors in Computing Systems; Chi 2009—Spotlights on Works in Progress—Session 2; Apr. 4-9, 2009, Boston MA; 6 pages.
Panchanathan, et al, "Social Interaction Assistant: A Person-Centered Approach to Enrich Social Interactions for Individuals with visual Impairments"; IEEE Journal of Selected Topics in Signal Processing, vol. 10, No. 5, Aug. 2016; 10 pages.
Vinciarelli et al., "Social Signal Processing: Survey of an emerging domain"; Image and Vision Computing, Elsevier, vol. 27, No. 12; (2009) 1743-1759.

* cited by examiner

ACCESSIBILITY DETERMINATION DEVICE, ACCESSIBILITY DETERMINATION METHOD, AND PROGRAM

CROSS REFERENCE TO RELATED APPLICATIONS

This is the U.S. national stage of application No. PCT/JP2021/004982, filed on Feb. 10, 2021. Priority under 35 U.S.C. § 119 (a) and 35 U.S.C. § 365 (b) is claimed from Japanese Application No. 2020-043947, filed Mar. 13, 2020, the disclosure of which is also incorporated herein by reference.

TECHNICAL FIELD

The present disclosure relates to an accessibility determination device that determines accessibility indicating an index of ease of communication with others.

BACKGROUND ART

In living a social life including communication such as conversation with others, it is one of the important matters to grasp whether or not a person is in a state where he/she may be spoken to. A device that determines whether or not someone such as an imaging target person is interested in a self, or the device is known. For example, Patent Document 1 discloses a product sales device capable of estimating whether a person in front of the device body is a person who intends to use the product sales device based on a transition of a position of the person with respect to the device body.

PRIOR ART DOCUMENT

Patent Document

Patent Document 1: JP 2014-174859 A

SUMMARY OF THE INVENTION

Problems to Be Solved by the Invention

However, even if a person approaches the self in terms of the transition of the position, smooth communication cannot be expected when the person does not face the self, the person has an angry face, or the like. In order to accurately judge whether or not the self can smoothly communicate with someone, it is not sufficient to grasp the transition of the position of the person.

An object of the present disclosure is to provide an accessibility determination device that enables a user to smoothly communicate with a target person such as an acquaintance.

Means for Solving the Problems

An accessibility determination device according to one aspect of the present disclosure includes:
 an imaging device that captures images of a surrounding environment of a user at time intervals to acquire a plurality of captured images;
 a facial organ detector that analyzes the captured images to detect a facial organ of a person different from the user;
 a processor that specifies at least one of a face orientation, a moving direction, and a facial expression of the person based on a detection result of the facial organ detector, and determines, based on a specified result, accessibility that indicates an index of ease for the user to communicate with the person;
 a target detector that detects whether or not the person is a predetermined target person based on a detection result of the facial organ detector; and
 a annunciator that makes a notification to the user when the accessibility determined by the processor satisfies a predetermined criterion and the target detector detects that the person is the predetermined target person, in which
 the processor changes the accessibility or the predetermined criterion depending on a distance between the imaging device and the person.

An accessibility determination device according to another aspect of the present disclosure includes:
 an imaging device that captures an image of a surrounding environment of a user to acquire a captured image;
 a facial organ detector that analyzes the captured image to detect a facial organ of a person different from the user;
 a processor that specifies a face orientation and a facial expression of the person based on a detection result of the facial organ detector, and determines, based on a specified result, accessibility that indicates an index of ease for the user to communicate with the person;
 a target detector that detects whether or not the person is a predetermined target person based on a detection result of the facial organ detector; and
 a annunciator that makes a notification to the user when the accessibility determined by the processor satisfies a predetermined criterion and the target detector detects that the person is the predetermined target person, in which
 the processor changes the accessibility or the predetermined criterion depending on a distance between the imaging device and the person.

Effects of the Invention

An accessibility determination device according to the present disclosure enables a user to smoothly communicate with a target person such as an acquaintance.

MODE FOR CARRYING OUT THE INVENTION

Figure 1:
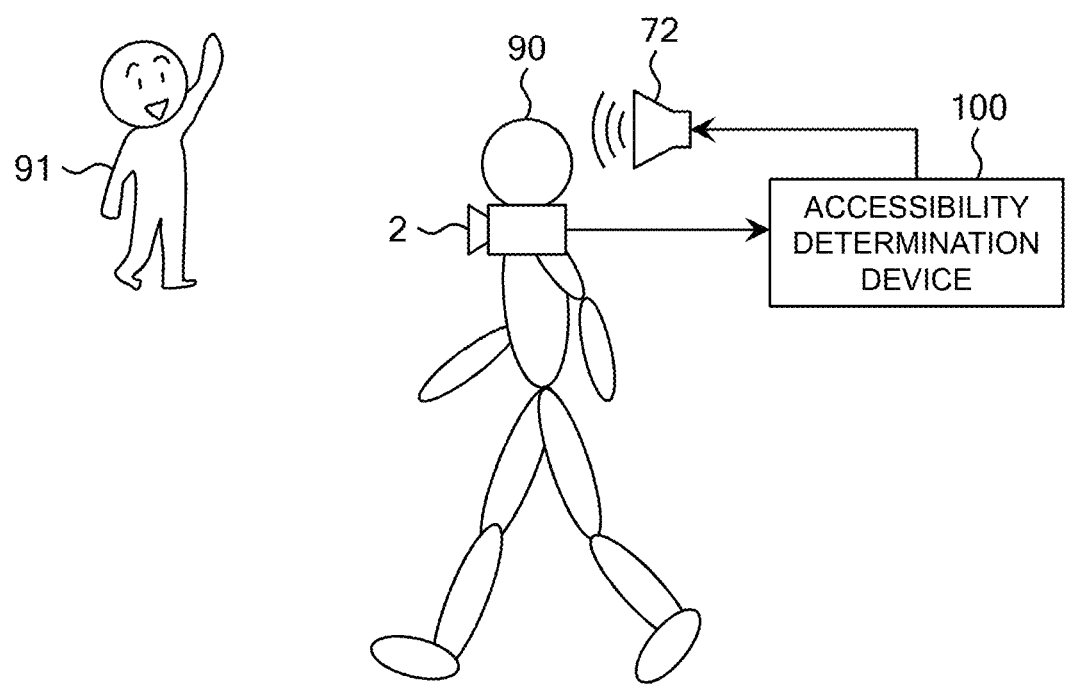
FIG. 1 is a schematic diagram illustrating an application example of an accessibility determination device according to an embodiment of the present disclosure.

An embodiment of a navigation device according to the present disclosure will be described below with reference to the accompanying drawings. Note that in the following embodiment, similar components are given identical reference numerals.

1. Application Example

FIG. 1 is a schematic diagram illustrating an application example of an accessibility determination device 100 according to the present embodiment. The accessibility determination device 100 captures an image of a surrounding environment of a user 90 by using a camera 2, and when a target person 91 such as an acquaintance who is in a state where he/she may be spoken to is around, makes a notification to the user 90 by using a audio device 72. The camera 2 is an example of the "imaging device" of the present disclosure.

The accessibility determination device 100 judges, based on an index of accessibility, whether or not the target person 91 such as an acquaintance is in a state where he/she may be spoken to. Here, the accessibility represents an index of ease for the user 90 to communicate with others. The accessibility is determined based on information on a face in a captured image captured by the camera 2.

For example, as presented in FIG. 1, in a case where the target person 91 faces the direction of the user 90 with a smile, the accessibility is high, and the target person 91 is deemed to be in a state where the person 91 may be spoken to by the user 90. In such a case, the accessibility determination device 100 makes a notification to the user 90 via the audio device 72. Content of notification is information such as, for example, the position of the target person 91, the name of the target person 91, and the level of accessibility. By the notification, the user 90 can recognize that the target person 91 in a state where he/she may be spoken to is around. Therefore, the user 90 can smoothly communicate with the target person 91 by speaking to the target person 91 or the like.

In particular, in a case where the user 90 is a visually impaired person, even if the user encounters an acquaintance in the town, it may happen that the user is not able to visually recognize the presence of the acquaintance. There is a case where the acquaintance passes by without having a conversation even if the user 90 desires to have a conversation with the acquaintance. In such a case, the accessibility determination device 100 makes a notification to the user 90 that an acquaintance in a high accessibility state is around, so that the user 90 can smoothly communicate with the acquaintance. Thus, the accessibility determination device 100 can be applied as a device that supports communication of the user 90 who is a visually impaired person.

The user 90 may be an autonomously movable robot. In this case, the components of the accessibility determination device 100 such as the camera 2 and the audio device 72 may be incorporated in the robot. In this case, while self-propelled, for example, the robot can recognize, based on a captured image by the camera 2, whether or not the target person 91 is in a state where he/she may be spoken to. This enables the robot to smoothly communicate with the human when the human and the robot coexist in society.

2. Configuration Example

Figure 2:
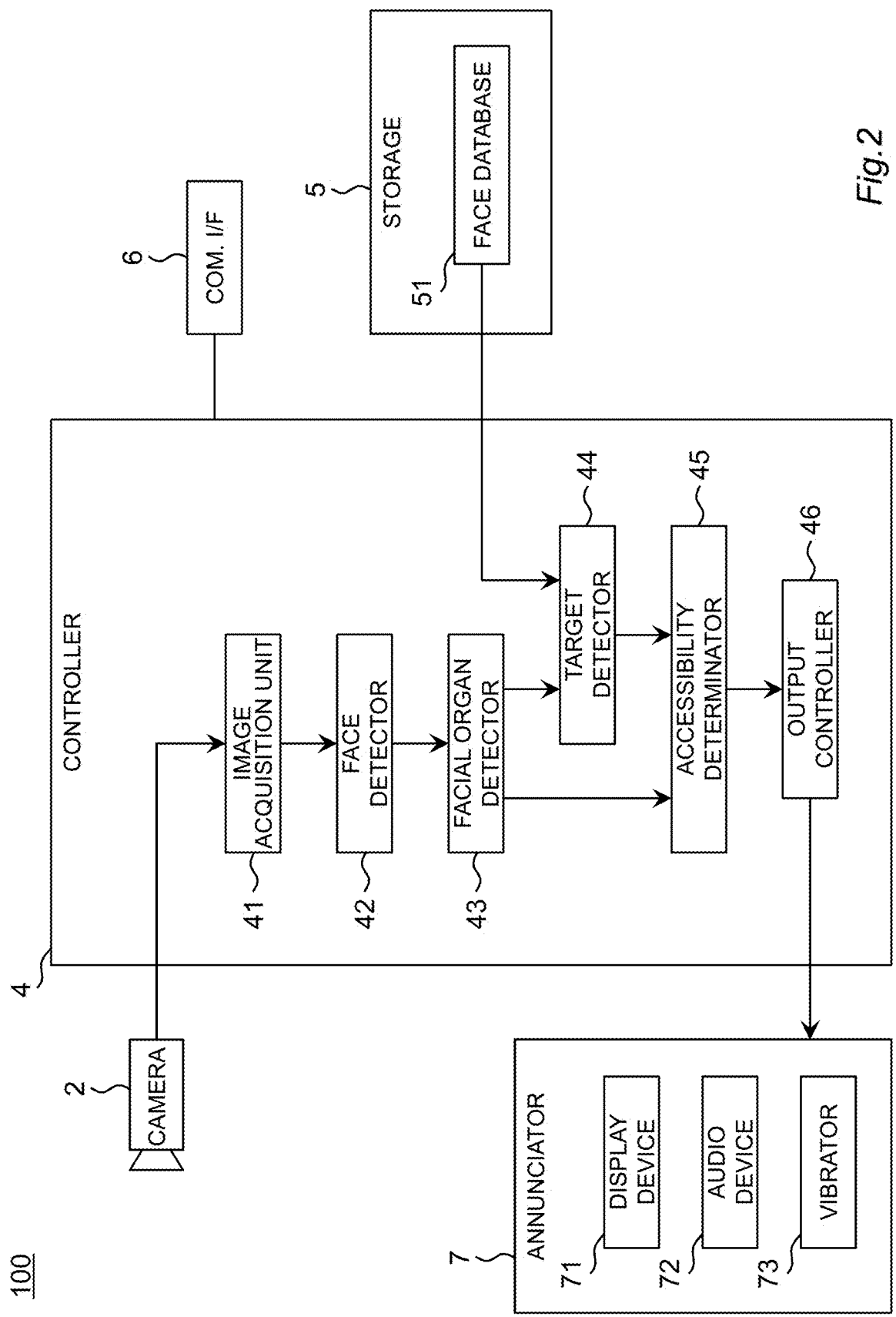
FIG. 2 is a block diagram illustrating a configuration example of the accessibility determination device according to the present embodiment.

FIG. 2 is a block diagram illustrating a configuration example of the accessibility determination device 100 according to the present embodiment. The accessibility determination device 100 includes the camera 2, a controller 4, a storage 5, a communication interface (I/F) 6, and an annunciator 7.

The camera 2 is an image-capturing device that captures an image of an environment around the user 90 to form a captured image. The camera 2 captures an image of a periphery of the user 90 at a predetermined frame rate, for example, and sequentially generates image data. The camera 2 forms a captured image by a solid-state imaging element such as a complementary MOS (CMOS) or a charge coupled device (CCD), for example. The camera 2 is, for example, a wearable camera that can be worn by the user 90. The camera 2 may be mounted on baggage of the user 90 such as a backpack or a suitcase.

The annunciator 7 is an output device that performs output in accordance with control by the controller 4, for example. The annunciator 7 makes a notification to the user 90. The annunciator 7 includes, for example, a display device 71, the audio device 72, and a vibrator 73. The display device 71 includes, for example, a liquid crystal display, an organic EL display, and a projector. The audio device 72 includes, for example, audio equipment such as a speaker, an earphone, and a headphone.

The controller 4 is an information processing device that includes a central processor (CPU), a random access memory (RAM), and read only memory (ROM), and performs control of each component of the accessibility determination device 100 in response to information processing. As components, the controller 4 includes, for example, an image acquisition unit 41, a face detector 42, a facial organ detector 43, a target detector 44, an accessibility determinator 45, and an output controller 46. By the controller 4 executing a necessary program, each component of the controller 4 may execute processing of which each component is in charge. Such a program may be stored in the storage 5. When executing a necessary program, the controller 4 expands, in the RAM, the target program stored in the storage 5. The controller 4 interprets and executes, by the CPU, the program expanded in the RAM to control each component. An operation example of each component will be described later.

The storage 5 is a medium that accumulates information on the program and the like by an electrical, magnetic, optical, mechanical, or chemical action so that a computer, another device, a machine, or the like can read the information on the recorded program or the like. The storage 5 is, for example, an auxiliary storage device such as a hard disk drive or a solid state drive. The storage 5 stores, for example, a face database 51, a program executed by the controller 4, and the like. The storage 5 may include a main storage device such as the RAM.

The communication interface 6 includes an interface circuit for enabling communication connection between the accessibility determination device 100 and external equipment. The communication interface 6 performs communication in conformity to a standard such as IEEE 802.3, IEEE 802.11, Wi-Fi (registered trademark), LTE, 3G, 4G, and 5G, for example. The communication interface 6 may be an interface circuit that performs communication in conformity to a standard such as Universal Serial Bus (USB), HDMI (registered trademark), IEEE 1394, and Bluetooth (registered trademark).

In the present embodiment, an example in which each function of the controller 4 is implemented by the CPU will be described. However, some or all of the above functions may be implemented by one or a plurality of dedicated processors. Regarding components of the controller 4, omission, replacement, and addition of functions may be performed as appropriate depending on an embodiment. The controller 4 may include various semiconductor integrated circuits such as a CPU, an MPU, a GPU, a microcomputer, a DSP, an FPGA, and an ASIC.

3. Operation Example

3-1. Overall Flow

The accessibility determination device 100 detects whether or not a target person such as an acquaintance appears in a captured image captured by the camera 2 and determines accessibility for the target person when the target person appears. When the determined accessibility is greater than a predetermined threshold value, the accessibility determination device 100 makes a notification to the user 90. This enables the user 90 to know whether or not the target person such as an acquaintance being around is in a state where he/she may be spoken to. Therefore, use of the accessibility determination device 100 allows the user 90 to smoothly communicate with an acquaintance or a person of interest in daily life. An operation example of the accessibility determination device 100 will be described below with reference to FIGS. 3 to FIG. 5.

Figure 3:
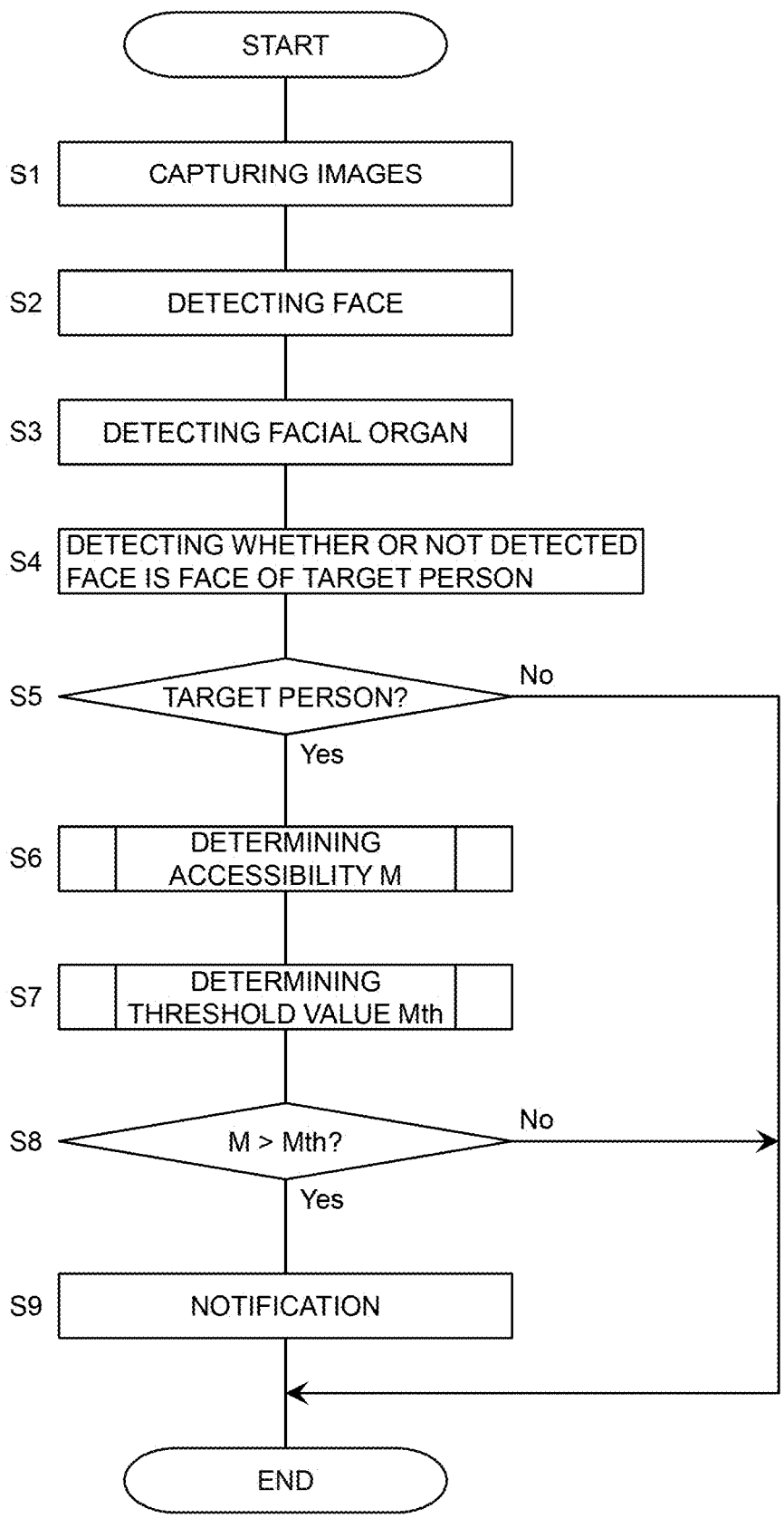
FIG. 3 is a flowchart presenting an operation example of the accessibility determination device according to the present embodiment.

FIG. 3 is a flowchart presenting an operation example of the accessibility determination device 100. The processing presented in FIG. 3 is executed at a predetermined period by the controller 4, for example.

Step S1

First, the image acquisition unit 41 acquires a captured image captured by the camera 2 (S1). For example, the camera 2 performs image-capturing at a constant frame rate. In step S1, the image acquisition unit 41 may acquire a plurality of captured images. A processing example in which after the image acquisition unit 41 acquires one captured image, the process proceeds to the next step S2 will be described below. However, the present disclosure is not limited to this. For example, in step S1, the image acquisition unit 41 may acquire a moving image including a plurality of frames or may acquire a plurality of still images.

Step S2

Next, the face detector 42 analyzes the captured image acquired by the image acquisition unit 41 and detects the face of a person (S2). Here, detecting the face of a person includes detecting a region where the face of a person is estimated to appear in a captured image.

Step S3

Next, the facial organ detector 43 detects an organ of the face (hereinafter, referred to as "facial organ") in the face detected by the face detector 42 (S3). Here, the facial organ includes a group of tissues having a specific function. For example, the facial organ includes eyes, nose, mouth, and ears. The facial organ may include skin. The entire face may be included in the facial organ. For example, the facial organ detector 43 detects the position of the facial organ.

Steps S4 and S5

Next, the target detector 44 detects whether or not the face detected by the face detector 42 is the face of a target person based on the detection result of the facial organ detector 43 and the face database 51 storing information regarding the face of the target person (S4). What is executed in step S4 is identity discrimination processing as to whether or not the face detected by the face detector 42 matches or resembles the face of the target person. The target person is someone whom the user 90 wants to communicate with or can communicate with, and includes an acquaintance, a celebrity, or the like of the user 90, for example. The information regarding the face referred to by the target detector 44 is not limited to the face database 51 stored in the storage 5. For example, the target detector 44 may refer to a database of faces stored in an external server connected to the network via the communication interface 6. When the detected face is the face of the target person (Yes in step S5), the process proceeds to step S6, and when the detected face is not the face of the target person (No in step S5), the controller 4 ends the flow presented in FIG. 3.

Detection of the face in step S2, detection of the facial organ in step S3, and detection of the target person in step S4 may be carried out using a known image analysis technique such as template matching, or a discriminator constructed by machine learning such as a neural network and a self-organization map.

Steps S6 and S7

In step S6, the accessibility determinator 45 determines accessibility M (S6). The accessibility determinator 45 is an example of the "processor" of the present disclosure. The accessibility M is an index of ease of communication between the user 90 and others. Next, the accessibility determinator 45 determines a threshold value Mth regarding the accessibility M (S7). The threshold value Mth is an example of the "predetermined criterion" of the present disclosure. Details of steps S6 and S7 will be described later.

Steps S8 and S9

Next, the output controller 46 judges whether or not the accessibility M is larger than the threshold value Mth (S8). When the accessibility M is judged to be the threshold value Mth or less in step S8 (No in step S8), the controller 4 ends the flow presented in FIG. 3 without making a notification. When the accessibility M is judged to be larger than the threshold value Mth (Yes in step S8), the output controller 46 controls the annunciator 7 to make a notification to the user 90 (S9). For example, in notification step S9, the display device 71 such as a display displays the name and the accessibility M of the acquaintance detected in step S4. The audio device 72 may notify the user 90 of these pieces of information by voice. In step S9, the vibrator 73 may vibrate to notify the user 90 of the fact that an acquaintance is around and the accessibility M for the acquaintance is larger than the threshold value Mth.

3-2. Decision Processing of Accessibility M

Figure 4:
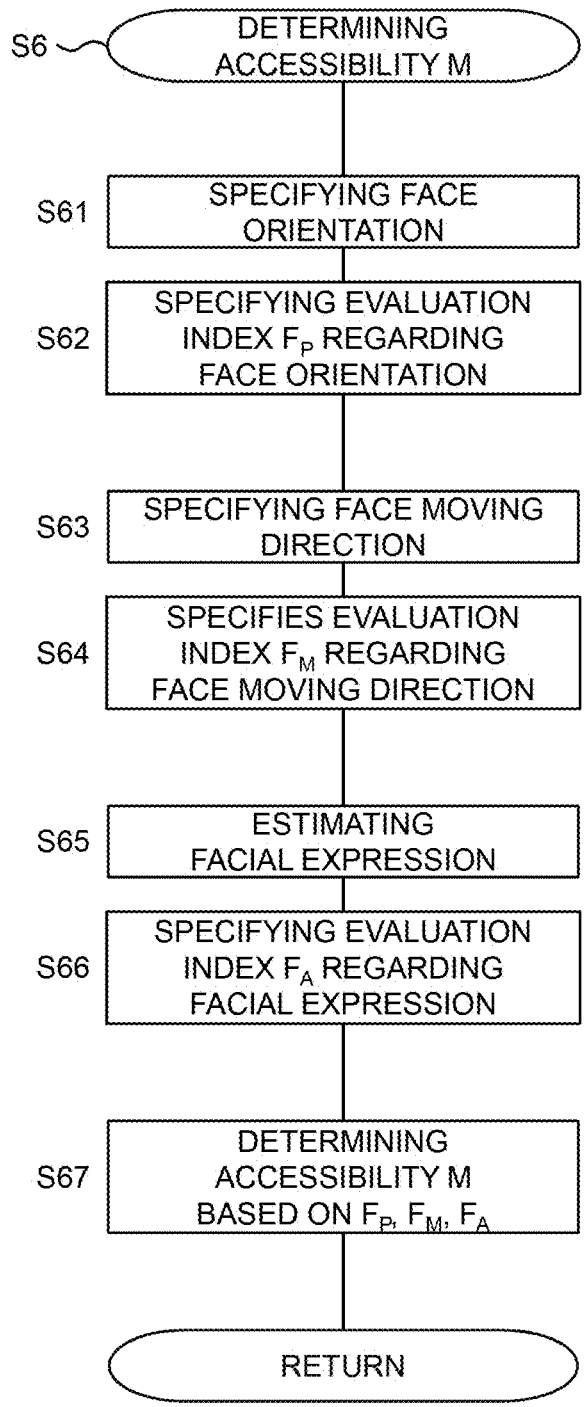
FIG. 4 is a flowchart presenting a flow of a decision step of accessibility presented in FIG. 3.

FIG. 4 is a flowchart presenting the flow of step S6 which determines the accessibility M presented in FIG. 3.

Step S61

First, the accessibility determinator 45 specifies the face orientation based on information on the facial organ detected in step S3 of FIG. 3 (S61). The face orientation can be obtained, for example, by detecting a feature amount representing the position of each facial organ from the detection result of step S3 in FIG. 3 and comparing this feature amount with a three-dimensional face shape model. The face orientation is expressed by, for example, a vector. The face orientation may be expressed by an angle that is 0° when facing the direction of the camera 2. The technique of obtaining the face orientation may be applied with a technique exemplified in WO 2006/051607, Japanese Patent No. 4093273, or the like.

Step S62

Next, the accessibility determinator 45 specifies a first evaluation index $F_P$ regarding the face orientation (S62). Here, the first evaluation index $F_P$ represents an evaluation index for evaluating the accessibility M with respect to the face orientation. It is also deemed that the first evaluation index $F_P$ is related to the face orientation among the components of the accessibility M. When the target person faces the direction of the camera 2, the accessibility determinator 45 sets the first evaluation index $F_P$ to a large value. For example, the first evaluation index $F_P$ is a value that becomes maximum when the angle of the face orientation is 0°, decreases as the angle increases, and becomes minimum when the angle is 180°. The first evaluation index $F_P$ may be expressed by multiplying an inner product of the orientation of an optical axis of the camera 2 and the face orientation of the target person by −1. The first evaluation index $F_P$ is normalized to be a value of 0 to 1, for example.

Step S63

The accessibility determinator 45 specifies the face moving direction based on information on the face detected in step S2 of FIG. 3 or information on the facial organ detected in step S3 (S63). For example, the accessibility determinator 45 compares the position of the face or the position of the facial organ in the plurality of captured images captured at different times and specifies the face moving direction. The face moving direction is, for example, a 3D position change vector of the face of the target person.

Step S64

Next, the accessibility determinator 45 specifies a second evaluation index $F_M$ regarding the face moving direction (S64). Here, the second evaluation index $F_M$ represents an evaluation index for evaluating the accessibility M with respect to the face moving direction. It is also deemed that the second evaluation index $F_M$ is related to the face moving direction among the components of the accessibility M. When the face moving direction is in the direction of the camera 2, the accessibility determinator 45 sets the second evaluation index $F_M$ to a large value. The second evaluation index $F_M$ is expressed by multiplying, for example, an inner product of the orientation of an optical axis of the camera 2 and the position change vector of the face of the target person multiplied by −1. The second evaluation index $F_M$ is normalized to be a value of 0 to 1, for example.

Step S65

The accessibility determinator 45 estimates the facial expression based on information of the facial organ detected in step S3 of FIG. 3 (S65). For example, the accessibility determinator detects, from information of the facial organ, a distance between feature points of the face such as the eyes, the eyebrows, and the mouth or an edge of the face surface, as information indicating the facial expression.

A known method may be used to estimate the facial expression. For example, the accessibility determinator 45 extracts a feature amount related to the relative position and shape of the facial organ based on the positional information of the facial organ. The feature amount includes, for example, a Haar-like feature amount, a distance between feature points, and a Fourier descriptor. Next, the extracted feature amount is input to a facial expression discriminator that discriminates a facial expression, and a facial expression score (facial expression component value) is output. The facial expression score includes a smile level indicating a degree of smiling and a happiness level indicating a degree of happiness. The facial expression discriminator is constructed by learning a large number of face sample images by machine learning such as neural network and self-organization map.

The estimation of the facial expression includes discriminating the type of the facial expression, that is, specifying the type of the recognition target facial expression using a word indicating the emotion. Here, the facial expression may be specified by a word indicating a single emotion or may be specified by a combination of words indicating emotions. When combining words indicating emotions, the words indicating the respective emotions may be weighted. For example, facial expressions are classified into seven types of "contempt", "enjoyment", "anger", "disgust", "surprise", "fear", and "sadness" based on the facial expression analysis by Paul Ekman. As the estimation result of the facial expression, a score in which the degree (also referred to as likelihood of facial expression and facial expression level) of each of the seven types of facial expressions is quantified so that the total becomes 1 is output. The score of each facial expression is also called a facial expression component value.

The facial expression discriminator needs not be one and may be configured by seven discriminators respectively in charge of the seven types of facial expressions.

The technique of estimating the facial expression may be applied with a technique exemplified in JP 2019-111092 A, JP 2016-149063 A, JP 2014-206903 A, or the like.

Step S66

Next to step S65, the accessibility determinator 45 specifies a third evaluation index $F_A$ regarding the facial expression (S66). Here, the third evaluation index $F_A$ represents an evaluation index for evaluating the accessibility M with respect to the facial expression. It is also deemed that the third evaluation index $F_A$ is related to the facial expression among the components of the accessibility M. When the facial expression is positive regarding communication, the accessibility determinator 45 sets the third evaluation index $F_A$ to a large value. The case where the facial expression is positive regarding communication includes a case where the facial expression is classified into "enjoyment" as a result of the facial expression estimation in step S65, for example. Alternatively, the case where the facial expression is positive regarding communication includes a case where the smile level or the happiness level is a predetermined threshold value or more as a result of the facial expression estimation in step S65.

Step S67

Next, the accessibility determinator 45 determines the accessibility M based on the first to third evaluation indices $F_P$, $F_M$, and $F_A$. For example, the accessibility M is a sum of the first to third evaluation indices $F_P$, $F_M$, and $F_A$. When the first to third evaluation indices $F_P$, $F_M$, and $F_A$ are normalized to be a value of 0 to 1, in order to normalize the accessibility M, a sum of the first to third evaluation indices $F_P$, $F_M$, and $F_A$ multiplied by ⅓ may be set as the accessibility M. The accessibility M may be a mean value of the first to third evaluation indices $F_P$, $F_M$, and $F_A$.

The example in which steps S61 to S67 are sequentially executed as presented in FIG. 4 has been described above. However, the decision processing step S6 of the accessibility M in the present embodiment is not limited to this. Specifically, step S62 needs to be executed after step S61, step S64 needs to be executed after step S63, and step S66 needs to be executed after step S65, steps S61, S63, and S65 may be executed in random order. Alternatively, steps S61, S63, and S65 may be processed in parallel.

As presented in FIG. 4, the example in which the accessibility determinator 45 determines all of the first to third evaluation indices $F_P$, $F_M$, and $F_A$ has been described above. However, the present disclosure is not limited to this. The accessibility determinator 45 is only required to determine at least one of the first to third evaluation indices $F_P$, $F_M$, and $F_A$. For example, in a case of deciding only the first evaluation index $F_P$, it is possible omit steps S63 to S66 in FIG. 4. In this case, in step S67, the accessibility M is determined based only on the first evaluation index $F_P$.

Alternatively, the accessibility determinator 45 may determine two of the first to third evaluation indices $F_P$, $F_M$, and $F_A$, and determine the accessibility M based on the determined two evaluation indices. In this case, for example, the first evaluation index $F_P$ and the third evaluation index $F_A$ are determined, and the accessibility M is determined based on the two.

3-3. Decision Processing of Threshold Value Mth of Accessibility M

Figure 5:
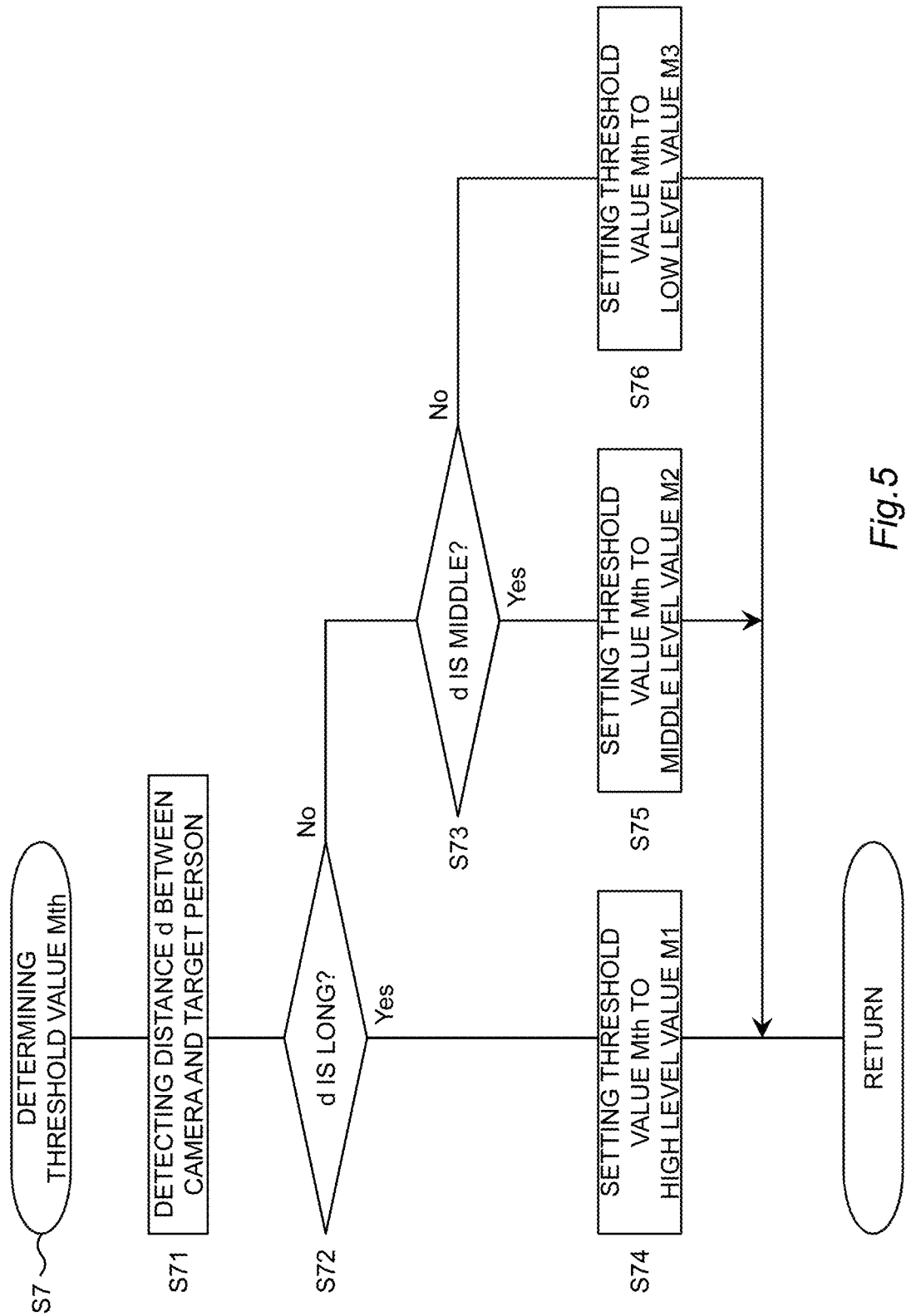
FIG. 5 is a flowchart presenting a flow of a decision step of a threshold value Mth presented in FIG. 3.

FIG. 5 is a flowchart presenting the flow of decision step S7 of the threshold value Mth presented in FIG. 3.

First, the accessibility determinator 45 detects a distance d between the camera 2 and the target person based on information on the face detected in step S2 of FIG. 3 or information on the facial organ detected in step S3 (S71). Since the camera 2 is a wearable camera worn by the user 90 or a camera mounted on the baggage of the user 90, a distance d between the camera 2 and the target person is deemed to be about the same as the distance between the user 90 and the target person.

Next, the accessibility determinator 45 determines whether the distance d detected in step S71 is a long distance, a middle distance, or a short distance (S72 and S73). For example, the accessibility determinator 45 determines that the distance d is a long distance when it is longer than 5 m, determines that the distance d is a middle distance when it is longer than 3 m and 5 m or less, and determines that the distance d is a short distance when it is 3 m or less.

When determining that the distance d is a long distance (Yes in step S72), the accessibility determinator 45 sets the threshold value Mth to a high level value M1 (S74). For example, in a case where the accessibility M is normalized, the high level value M1 is set to 0.8.

When determining that the distance d is a middle distance (Yes in step S73), the accessibility determinator 45 sets the threshold value Mth to a middle level value M2 lower than the high level value M1 (S75). For example, in a case where the accessibility M is normalized, the middle level value M2 is set to 0.5.

When determining that the distance d is a short distance (No in step S73), the accessibility determinator 45 sets the threshold value Mth to a low level value M3 lower than the middle level value M2 (S76). For example, in a case where the accessibility M is normalized, the low level value M3 is set to 0.2.

In this manner, the longer the distance d is, the stricter the controller 4 makes a condition for executing the notification step S9 (step S8).

The controller 4 is only required to make the notification condition stricter as the distance d is longer, and the means for making it stricter is not limited to those exemplified in FIGS. 3 and FIG. 5. An example of means for making the notification condition stricter as the distance d is longer will be described below. For example, in a case of determining that the distance d is a long distance, the controller 4 executes the notification step S9 only when all of the first to third evaluation indices $F_P$, $F_M$, and $F_A$ are 0.8 or more. In a case of determining that the distance d is a middle distance, the controller 4 executes the notification step S9 when two or more of the first to third evaluation indices $F_P$, $F_M$, and $F_A$ are 0.8 or more. In a case of determining that the distance d is a short distance, the controller 4 executes the notification step S9 if any one of the first to third evaluation indices $F_P$, $F_M$, and $F_A$ is 0.8 or more.

Another example of means for making the notification condition stricter as the distance d is longer will be described below. The accessibility determinator 45 may change the accessibility M depending on the distance d between the camera 2 and others. For example, the accessibility determinator 45 may set, as the accessibility M, the sum of the first to third evaluation indices $F_P$, $F_M$, and $F_A$ divided by the distance d. Due to this, the longer the distance d is, the smaller the accessibility M becomes, and even if the threshold value Mth is a constant value, the longer the distance d is, the less executable the notification step S9 becomes.

4. Actions and Effects

As described above, the accessibility determination device 100 according to the present embodiment includes the camera 2, which is an example of the imaging device, the facial organ detector 43, the accessibility determinator 45, which is an example of the processor, the target detector 44, and the annunciator 7. The camera 2 captures images of a surrounding environment of the user 90 at time intervals to acquire a plurality of captured images (S1). The facial organ detector 43 analyzes the captured image to detect a facial organ of a person different from user 90 (S3). The accessibility determinator 45 specifies at least one of the face orientations, the moving direction, and the facial expression of the person based on the detection result of the facial organ detector 43. The accessibility determinator 45 determines, based on the specified result, the accessibility M that indicates an index of ease for the user 90 to communicate with the person (S6). The target detector 44 detects whether or not the person is a predetermined target person based on a detection result of the facial organ detector 43 (S4). The annunciator 7 makes a notification to the user 90 when the accessibility M determined by the accessibility determinator 45 satisfies a predetermined criterion and the target detector 44 detects that the person is the predetermined target person (S9). The accessibility determinator 45 changes the accessibility M or the predetermined criterion depending on the distance between the camera 2 and the person (S7).

This configuration enables the user 90 to recognize, by notification, that the target person such as an acquaintance is around, which is a state where the accessibility M satisfies the predetermined criterion. The user 90 can recognize that the target person recognized by the notification is in a state where the user may speak to. Therefore, the user 90 can smoothly communicate with the target person such as an acquaintance in daily life.

The camera 2 needs not capture images at time intervals to acquire a plurality of captured images but may capture an image of a surrounding environment of the user 90 to acquire a captured image. The accessibility determinator 45 may specify the face orientation and the facial expression of the person based on the detection result of the facial organ detector 43 and determines the accessibility M based on the specified result.

In this manner, even the configuration of specifying the two parameters of the face orientation and the facial expression of others can determine the accessibility M. Therefore, similarly to the above, the user 90 can smoothly communicate with the target person such as an acquaintance in daily life.

The accessibility determinator 45 may also specify the face orientation, the facial expression, and the face moving direction of others based on the detection result of the facial organ detector 43 and determines the accessibility M based on the specified result.

In this manner, the configuration of specifying the three parameters of the face orientation, the facial expression, and the face moving direction of others can accurately determine the accessibility M. Therefore, similarly to the above, the user 90 can smoothly communicate with the target person such as an acquaintance in daily life.

In the present embodiment, when the target detector 44 detects that a person is a predetermined target person, the accessibility determinator 45 may determine the accessibility M for the person. On the other hand, when the target detector 44 does not detect that a person is a predetermined target person, the accessibility determinator 45 needs not determine the accessibility M for the person.

This makes it possible to omit processing of deciding the accessibility M for a person in a case where the person is not a predetermined target person such as an acquaintance. This can reduce processing load of the accessibility determination device 100.

5. Modifications

While the embodiment of the present disclosure has been described in detail above, the above description is merely an example of the present disclosure in all respects. Various improvements and modifications can be made without departing from the scope of the present disclosure. For example, the following changes can be made. In the following, the same reference numerals will be used for the same components as those of the above embodiment, and the description of the same points as those of the above embodiment will be omitted as appropriate. The following modifications can be combined as appropriate.

Figure 6:
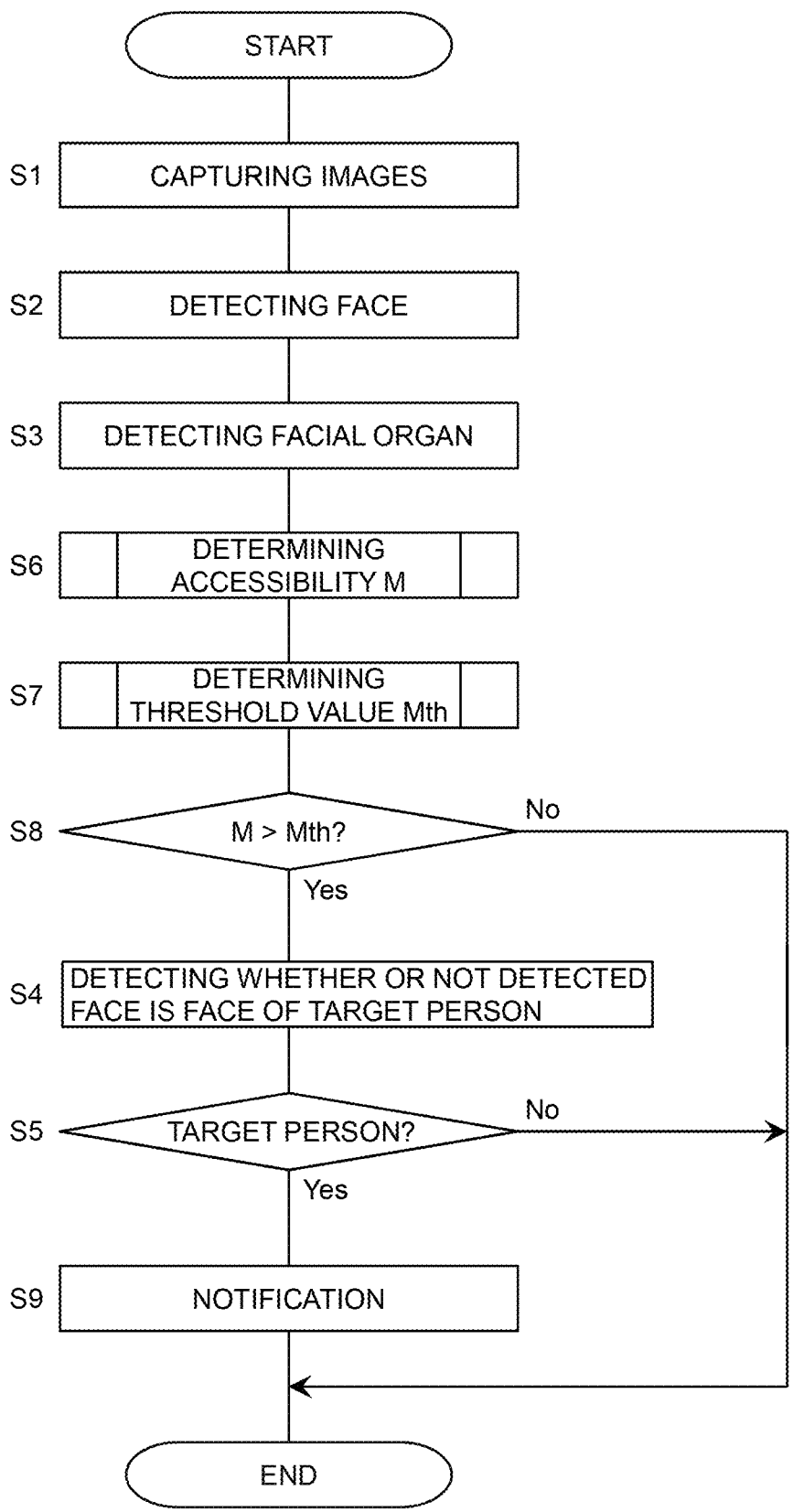
FIG. 6 is a flowchart presenting a modification of the operation of the accessibility determination device according to the present embodiment.

FIG. 6 is a flowchart presenting a modification of the operation of the accessibility determination device 100. In the flowchart of FIG. 6, steps S6 to S8 are executed after step S3. In the flowchart of FIG. 3, step S8 of judging as to whether or not the accessibility M is larger than the threshold value Mth is processing executed only when the face detected in step S2 is the face of the target person (Yes in step S5). On the other hand, in the flowchart of FIG. 6, step S8 of judging as to whether or not the accessibility M is larger than the threshold value Mth is always executed, and only in a case of Yes in step S8, step S4 of detecting as to whether or not the face detected in step S2 is the face of the target person is executed.

As described above, in a modification, the target detector 44 detects whether or not a person is a predetermined target person in a case where the accessibility M determined by the accessibility determinator 45 satisfies a predetermined criterion and does not detect whether or not a person is a predetermined target person in cases otherwise.

With this configuration, the accessibility determination device 100 executes the identity discrimination processing with the face of the target person only for those for which the accessibility M satisfies a predetermined criterion among faces detected from a captured image. In a case where the accessibility M does not satisfy a predetermined criterion, such the identity discrimination processing can be omitted. This can reduce processing load of the accessibility determination device 100.

Additional Note

Hereinafter, various aspects according to the present disclosure will be described. It should be noted, however, that the references numerals described below are used for illustrative purposes only.

An accessibility determination device 100 according to Aspect 1 of the present disclosure comprises:

an imaging device 2 that captures images of a surrounding environment of a user 90 at time intervals to acquire a plurality of captured images;

a facial organ detector 43 that analyzes the captured images to detect a facial organ of a person different from the user 90;

a processor 45 that specifies at least one of a face orientation, a moving direction, and a facial expression of the person based on a detection result of the facial organ detector 43, and determines, based on a specified result, accessibility that indicates an index of ease for the user 90 to communicate with the person;

a target detector 44 that detects whether or not the person is a predetermined target person based on a detection result of the facial organ detector 43; and an annunciator 7 that makes a notification to the user 90 when the accessibility determined by the processor 45 satisfies a predetermined criterion and the target detector 44 detects that the person is the predetermined target person, wherein the processor 45 changes the accessibility or the predetermined criterion depending on a distance between the imaging device 2 and the person.

An accessibility determination device 100 according to Aspect 2 of the present disclosure comprises:

an imaging device 2 that captures an image of a surrounding environment of a user 90 to acquire a captured image;

a facial organ detector 43 that analyzes the captured image to detect a facial organ of a person different from the user 90;

a processor 45 that specifies a face orientation and a facial expression of the person based on a detection result of the facial organ detector 43, and determines, based on a specified result, accessibility that indicates an index of ease for the user 90 to communicate with the person;

a target detector 44 that detects whether or not the person is a predetermined target person based on a detection result of the facial organ detector 43; and an annunciator 7 that makes a notification to the user 90 when the accessibility determined by the processor 45 satisfies a predetermined criterion and the target detector 44 detects that the person is the predetermined target person, wherein the processor 45 changes the accessibility or the predetermined criterion depending on a distance between the imaging device 2 and the person.

Aspect 3 of the present disclosure provides the accessibility determination device 100 according to Aspect 2, wherein the imaging device 2 captures images of a surrounding environment of the user 90 at time intervals to acquire a plurality of captured images, and the processor 45 further specifies a face moving direction of the person based on a detection result of the facial organ detector 43, and determines the accessibility further based on a specified face moving direction of the person.

In accordance with Aspect 4 of the present disclosure, the accessibility determination device 100 according to any one of Aspects 1 to 3 is provided, wherein the processor determines the accessibility for the person when the target detector 44 detects that the person is the predetermined target person, and does not determine the accessibility for the person when the target detector 44 does not detect that the person is the predetermined target person.

In accordance with Aspect 5 of the present disclosure, the accessibility determination device 100 according to any one of Aspects 1 to 3 is provided, wherein the target detector 44 detects whether or not the person is the predetermined target person in a case where the accessibility determined by the processor 45 satisfies the predetermined criterion, and does not detect whether or not the person is the predetermined target person in a case where the accessibility determined by the processor 45 does not satisfy the predetermined criterion.

An accessibility determination method according to Aspect 6 of the present disclosure comprises the steps of:

acquiring (S1), by a controller, a plurality of captured images obtained by capturing images of a surrounding environment of a user 90 at time intervals;

detecting (S3) a facial organ, by the controller, by analyzing the captured images to detect a facial organ of a person different from the user 90;

deciding (S6) accessibility, by the controller, by specifying at least one of a face orientation, a moving direction, and a facial expression of the person based on a detection result of the detecting the facial organ to determine, based on a specified result, accessibility that indicates an index of ease for the user 90 to communicate with the person;

detecting (S6) a target person, by the controller, by detecting whether or not the person is a predetermined target person based on the detection result of the detecting the facial organ; and making (S9) a notification to the user 90 when the accessibility determined in the deciding the accessibility satisfies a predetermined criterion and in the detecting the target person, the person is detected to be the predetermined target person.

In accordance with Aspect 7 of the present disclosure, a program for causing a computer to execute the accessibility determination method according to Aspect 6 is provided.

DESCRIPTION OF REFERENCE CHARACTERS 2 camera
4 controller
5 storage
6 communication interface
7 annunciator
41 image acquisition unit
42 face detector
43 facial organ detector
44 target detector
45 accessibility determinator
46 output controller
51 face database
71 display device
72 audio device
73 vibrator
90 user
100 accessibility determination device

The invention claimed is:

1. An accessibility determination device comprising:
an imaging device that captures images of a surrounding environment of a user at time intervals to acquire a plurality of captured images;
a processor that:
analyzes the captured images to detect a facial organ of a person different from the user;
specifies at least one of a face orientation, a moving direction, and a facial expression of the person based on a detection result of the facial organ, and determines, based on a specified result, accessibility that indicates an index of ease for the user to communicate with the person; and
detects whether or not the person is a predetermined target person based on a detection result of the facial organ; and
an annunciator that makes a notification to the user when the accessibility determined by the processor satisfies a predetermined criterion and the processor detects that the person is the predetermined target person, wherein
the processor:
sets the predetermined criterion to a first value when a distance between the imaging device and the person is less than a predetermined threshold distance; and
sets the predetermined criterion to a second value greater than the first value when the distance is equal to or greater than the predetermined threshold distance.

2. An accessibility determination device comprising:
an imaging device that captures an image of a surrounding environment of a user to acquire a captured image;
a processor that:
analyzes the captured image to detect a facial organ of a person different from the user;
specifies a face orientation and a facial expression of the person based on a detection result of the facial organ, and determines, based on a specified result, accessibility that indicates an index of ease for the user to communicate with the person; and detects whether or not the person is a predetermined target person based on a detection result of the facial organ; and an annunciator that makes a notification to the user when the accessibility determined by the processor satisfies a predetermined criterion and the processor detects that the person is the predetermined target person, wherein the processor:

sets the accessibility or the predetermined criterion to a first value when a distance between the imaging device and the person is less than a predetermined threshold distance; and sets the predetermined criterion to a second value greater than the first value when the distance is equal to or greater than the predetermined threshold distance.

3. The accessibility determination device according to claim 2, wherein the imaging device captures images of a surrounding environment of the user at time intervals to acquire a plurality of captured images, and the processor further specifies a face moving direction of the person based on a detection result of the facial organ, and determines the accessibility further based on a specified face moving direction of the person.

4. The accessibility determination device according to claim 1, wherein the processor determines the accessibility for the person when detecting that the person is the predetermined target person, and does not determine the accessibility for the person when not detecting that the person is the predetermined target person.

5. The accessibility determination device according to claim 1, wherein the processor detects whether or not the person is the predetermined target person in a case where the accessibility determined by the processor satisfies the predetermined criterion, and does not detect whether or not the person is the predetermined target person in a case where the accessibility determined by the processor does not satisfy the predetermined criterion.

6. An accessibility determination method comprising the steps of:

acquiring, by a processor, a plurality of captured images obtained by capturing images of a surrounding environment of a user at time intervals;

detecting a facial organ, by the processor, by analyzing the captured images to detect a facial organ of a person different from the user;

deciding accessibility, by the processor, by specifying at least one of a face orientation, a moving direction, and a facial expression of the person based on a detection result of the detecting the facial organ to determine, based on a specified result, accessibility that indicates an index of ease for the user to communicate with the person;

detecting a target person, by the processor, by detecting whether or not the person is a predetermined target person based on the detection result of the detecting the facial organ;

setting, by the processor, the predetermined criterion to a first value when a distance between the imaging device and the person is less than a predetermined threshold distance;

setting, by the processor, the predetermined criterion to a second value greater than the first value when the distance is equal to or greater than the predetermined threshold distance; and making a notification to the user when the accessibility determined in the deciding the accessibility satisfies the predetermined criterion and in the detecting the target person, the person is detected to be the predetermined target person.

7. A computer-readable storage medium including a program for causing a computer to execute the accessibility determination method according to claim 6.

8. The accessibility determination device according to claim 2, wherein the processor determines the accessibility for the person when detecting that the person is the predetermined target person, and does not determine the accessibility for the person when not detecting that the person is the predetermined target person.

9. The accessibility determination device according to claim 2, wherein the processor detects whether or not the person is the predetermined target person in a case where the accessibility determined by the processor satisfies the predetermined criterion, and does not detect whether or not the person is the predetermined target person in a case where the accessibility determined by the processor does not satisfy the predetermined criterion.

* * * * *